United States Patent [19]
Salamon et al.

[11] 3,906,330
[45] Sept. 16, 1975

[54] OPERATION OF MULTICELL TRACTION BATTERIES

[75] Inventors: Klaus Salamon, Kelkheim; Heinrich Busch, Wesel; Eberhard Zander, Kirchhellen, all of Germany

[73] Assignee: Varta Batterie A.G., Hannover, Germany

[22] Filed: Oct. 1, 1974

[21] Appl. No.: 510,989

[30] Foreign Application Priority Data
Oct. 8, 1973   Germany............................ 2350353

[52] U.S. Cl.................................... 320/46; 136/179
[51] Int. Cl.² .......................................... H01M 2/12
[58] Field of Search ........ 320/31, 46; 136/179, 180; 318/139; 180/65

[56] References Cited
UNITED STATES PATENTS

| | | | |
|---|---|---|---|
| 1,302,648 | 5/1919 | Flanders | 136/179 X |
| 1,324,797 | 12/1919 | Chubb | 136/179 |
| 1,993,785 | 3/1935 | Himes | 320/31 |
| 2,051,039 | 8/1936 | Guthrie | 136/179 |

Primary Examiner—J. D. Miller
Assistant Examiner—Robert J. Hickey
Attorney, Agent, or Firm—Gerard J. Weiser; Alfred Stapler; Karl L. Spivak

[57] ABSTRACT

Gas evolved from the storage batteries used in battery operated vehicles is treated in on-board recombination reactors while the batteries are subjected to no more than charge factor 1 charging, but is treated in a large-capacity central recombination reactor permanently installed at a charging station while the batteries are subjected to full or compensating charging.

10 Claims, 2 Drawing Figures

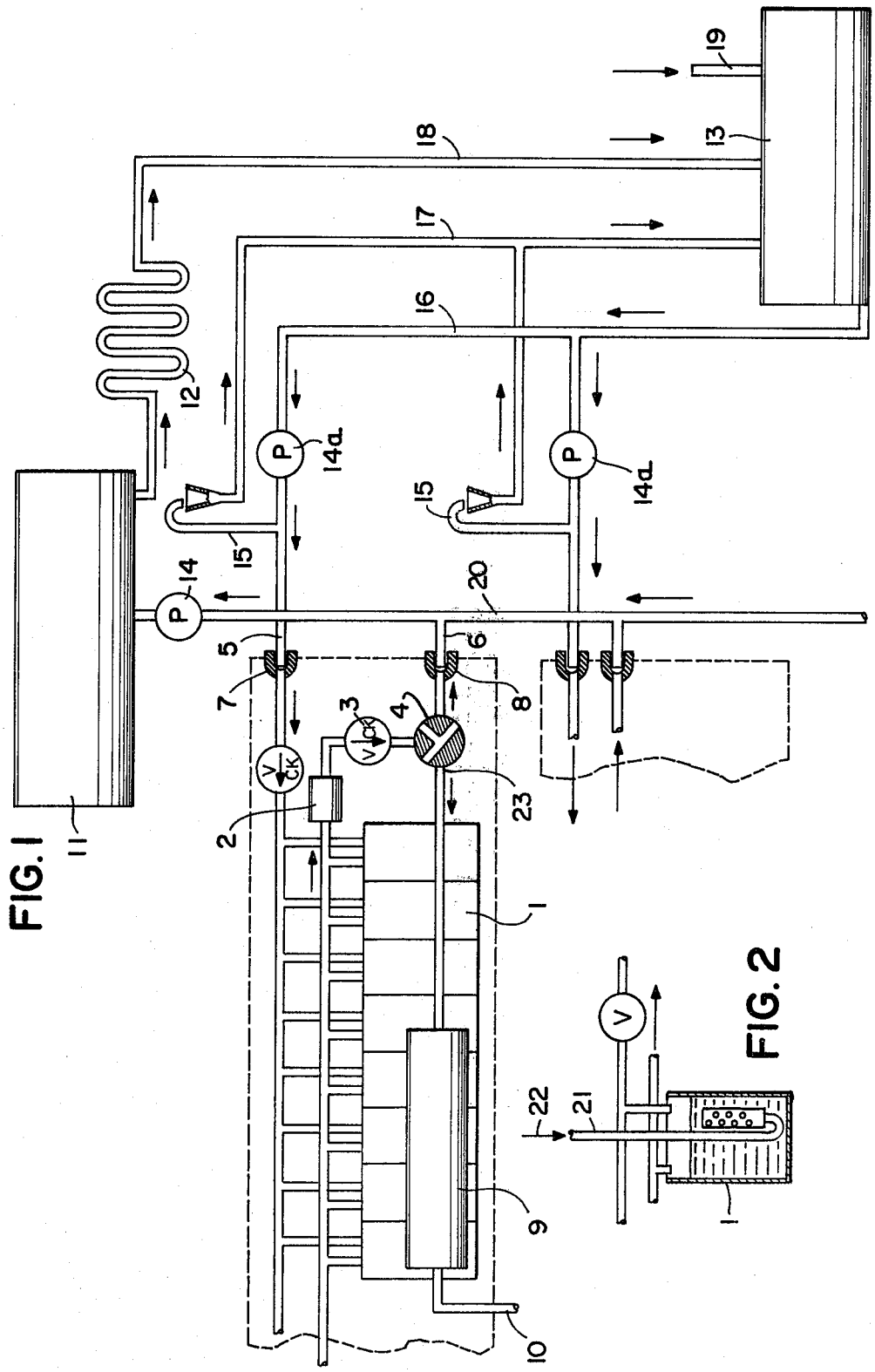

OPERATION OF MULTICELL TRACTION BATTERIES

The invention relates to a method and apparatus for the operation of multi-cell storage batteries for battery operated vehicles.

In lead storage batteries, hydrogen is evolved through internal discharge, under both open and closed circuit conditions. During charging, hydrogen and oxygen are evolved due to the high charging potential of the storage batteries, which exceeds the decomposition potential of the water. These electrolysis losses represent a significant reason why such storage batteries must be serviced at regular intervals.

Particularly in order to lengthen the intervals between servicings, multi-cell storage batteries are provided with centralized water refill systems. These permit centralized refilling of all the cells with distilled water, thereby compensating for the loss of water caused by electrolysis during charging and discharging.

To control the water regime of a lead acid storage battery, it has been proposed to recombine the gases which evolve during charging and/or discharging, or even when the battery is open-circuited, with the aid of so-called catalyst plugs. The reaction water condenses in these plugs and flows back into the electrolyte. Such an arrangement, however, is very expensive because each cell requires a catalyst plug. In addition, it is unreliable because the probability that a single plug may become inoperative is greatly magnified when several are involved, and even the loss of a single plug can lead to major malfunctions.

In addition, space limitations preclude the use of such an arrangement, particularly with vehicle batteries, because of the positioning of the catalyst plugs at the top of the battery.

Starting from these individual catalyst plugs, it is further known to provide, e.g. for a starter battery, a central water refill arrangement combined with a central recombination reactor (see German Gebrauchsmuster No. 7,133,811).

Such an arrangement can also not be used in battery operated vehicles, because the large quantity of evolved gases places a lower limit on the size of the recombination reactor, and because high costs are involved in making provisions within the vehicle itself to dissipate the heat generated by the recombination. In a battery of, say, 50 amperes-hours at 144 volts, recombination of the gas quantities which evolve during full charging produces heat equivalent to approximately 3 kw. Dissipation of this heat would entail much too great expense, and too much space for the requied cooling system. Consequently, it is not practical to use central recombination reactors in vehicles even though these may intrinsically be quite satisfactory.

In the operation of storage batteries for electric vehicles, charging is carried out both at a charging station and in the vehicle itself. Charging during operation of the vehicles, or interim charging, must normally take place within a short time period, so that the charge factor may then be less than 1, the charge factor being the ratio of total quantity of charge replaced through charging to total quantity of charge removed through discharging. However, repeated charging at such charge factors reduces the capacity of the battery. Consequently, full and compensating charging at the prescribed charge factor is carried out at predetermined intervals. The gas evolution is different for the different charging processes. Particularly during interim charging in the vehicle, care must be taken to keep down the water losses.

To operate numerous electric vehicles, there therefore arise two alternate possibilities. One requires a battery which is as service-free as possible, which assures that no dangerous gas mixtures are produced during operation, and which utilizes a recombination arrangement that has low weight and occupies a small space so as not to further reduce the vehicle payload. The other requies an operating method which permits service-free operation, even though the batteries are intrinsically service-intensive.

It is an object of the invention to meet one or more of the requirements outlined above.

This object, and others which will appear, are achieved in accordance with the invention in the following manner. During operation of the batteries in the vehicle, only partial charging or charging to at most a charge factor of 1 are carried out. In charging stations outside the vehicle, full and compensating charging is carried out. The comparatively small gas quantities produced during charging and/or discharging are rendered harmless in a small recombination reactor associated with the battery. The greater quantities of charging gas produced during full charging are recombined into water in a central recombination reactor permanently installed at the charging station. In so doing, charging gases from the battery are supplied to the recombination reactor by a manifold and, if necessary, also a suction pump. The recombined water is returned to the central water refill system of the storage battery through a water pipe and, if necessary, also with the aid of a pump.

In the course of the full and compensating charging which normally takes place at prescribed service intervals in a charging station rather than in the vehicle, the storage battery with its central water refill arrangement and central gas duct, is connected to a recombination installation which is permanently installed at the station. The permanently installed recombination reactor may, for example, be connected through plug-in couplings to the gas manifold of the storage battery and to the central refill arrangement. The oxygen and hydrogen evolved during charging and overcharging is recombined in that recombination reactor. Simultaneously, the storage battery is refilled with distilled water through its filling arrangement.

Use of the central recombination reactor, located outside the vehicle, has a number of significant advantages. In particular, heat dissipation presents no particular problem, because, in the permanently installed station, sufficient cooling water, for example, is readily available.

Furthermore, such a central recombination reactor can readily be designed to treat the electrolysis gases evolved during simultaneous charging of several storage batteries. It becomes possible to use less costly recombination reactors in association with the individual batteries themselves, and there is also assurance that dangerous charging gases will not be formed, either in the vehicle or in the station. The reaction which takes place in the recombination reactor proceeds especially well when the gas is caused to circulate by means of a gas pump at a temperature-controlled velocity. The ventilation which this produces is conducive to intensive interaction in the reaction catalysor. Assuming gas-tight cell containers and gas-tight duct system, the suction of the pump creates a partial vacuum in the individual cells.

By providing in the battery cell an immersion pipe which extends almost to the bottom of the electrolyte and whose upper end is exposed to the atmosphere, outside air is caused to flow into the cell due to the above-mentioned pressure difference, and to penetrate the electrolyte. This percolating air leads to good mixing and thereby improves the charging process, in addition to also improving the cooling. Moreover, the explosive gases in the space above the electrolyte surface are diluted, thereby considerably reducing their ignitability.

As previously explained, at least partial or interim charging of the storage battery takes place mainly in the vehicle, and even in a battery which is not in use, hydrogen evolves through internal discharge. It is therefore useful and desirable to provide, in addition to the central recombination reactor at the central charging station, an additional recombination reactor which is associated with the individual storage battery and which is installed in the vehicle, or possibly right in the storage battery itself. This latter recombination reactor needs to be only of such configuration or dimensions as to be capable of recombining the gases which evolve during charging or discharging while in operation. The quantities of gases evolved on those occasions are considerably less and can be further considerably reduced by the use of special charging procedures. For example, it may be desirable to control the charging of the storage battery in such a way that the charging current depends on the quantity of gas concurrently evolved.

To this end, control of the charging equipment can be carried out, in known manner, through measurement of the temperature of the recombination reactor. This makes it possible to keep the gas quantity approximately constant, so that the recombination reactor associated with the storage battery itself does not become overloaded.

The recombination reactor within the vehicle can further be so arranged that the water it produces is piped back into the central water refilling arrangement of the battery. If, however, the battery has adequate electrolyte reserve to last through the intervals between servicings, then it may also suffice to simply let the water so formed escape, rather than returning it to the circulatory system.

For further details, reference is made to the discussion which follows, in the light of the accompanying drawings wherein:

FIG. 1 shows the overall system embodying the invention; and

FIG. 2 shows an alternative construction for handling the gas within an individual cell of the battery.

The same reference numerals designate similar elements in the different figures.

Referring to FIG. 1, during charging there is evolved through electrolysis an explosive gas mixture in each gas cell 1. This gas is ducted, via acid trap 2, flame blowback protector 3, three-way valve 4, and plug-in connector 8,6, to gas removal duct 20 and through it to the permanently installed recombiner 11. There the gas is recombined into water vapor and then discharged into condenser 12. There the water vapor is cooled to its condensation point. The water so produced flows through return conduit 18 into water storage container 13, whose filler pipe is designated by reference numeral 19.

The water loss occurring in the cells is compensated as follows. Pump 14a draws water out of water storage container 13 through conduit 16 in predetermined volume and delivers it, through plug-in connector 5,7 to the central refill arrangement of the battery. To make sure that the water is supplied at constant pressure, an overflow pipe 15 is provided.

The excess water flows through overflow conduit 17 back into water storage container 13. The height of the overflow pipe determines the magnitude of the water pressure.

Referring to FIG. 2, this shows an alternative arrangement of cell 1, in which there is provided a tubelet 21 in each such cell. Outside air 22 is admitted through tubelet 21 and is discharged below the surface of the acid contained in the cell. If this cell arrangement is used in the system of FIG. 1, then a pump 14 should be inserted as shown in FIG. 1 in conduit 20, or alternatively between recombiner 11 and condenser 12, so as to draw the gas out of the battery cells. In this arrangement, stirring of the electrolyte is achieved during charging, and this prevents stratification of the acid in accordance with its concentration, and also provides a cooling effect. In addition, the cell space above the electrolyte, which is normally filled with explosive gas is aerated, sometimes to such an extent that ignition becomes impossible.

The operation described above is for the charging process in a charging station. Gas also evolves in the batteries during charging and discharging within the vehicle even though in lesser quantity. When the battery is mounted in the vehicles, the three-way valve 4 switches over and places into operation the recombiner 9 which is associated with the vehicle or the battery itself. The gas produced under those conditions then reaches recombiner 9 via the connecting conduit 23, where it is recombined into water vapor or water, and ultimately drips thorugh outlet 10, either to the outside as waste water, or into a suitable receptacle, or back again into the central water refill arrangement, which is conventional and therefore need not be further described.

We claim:

1. A method of operating multi-cell storage batteries for battery operated vehicles, said method comprising:
carrying out only partial battery charging or charging to at most a charge factor of 1 while the batteries are in the vehicles; and
carrying out full and compensating charging while the batteries are in charging stations outside the vehicle,
the comparatively small gas quantities evolved during charging and discharging in the vehicle being rendered harmless in a small recombination reactor associated with the vehicle or the battery, and
the comparatively large quantities of charging gas evolved during full charging being recombined into water in a central recombination reactor permanently installed at the charging station,
the central recombination reactor being supplied with the charging gases from the storage battery via a gas manifold, and
the recombined water being returned to the central battery water refill arrangement.

2. The method of claim 1 wherein the charging in the vehicle is controlled in response to the quantity of gas evolved.

3. The method of claim 1 wherein the central recombination reactor is utilized to charge several batteries simultaneously during the entire charging period.

4. The method of claim 1 wherein the central recombination reactor is connected to the battery only during the portion of the charging period having the most gas evolution.

5. The method of claim 1 wherein the gases are drawn from the storage battery through the manifold, and wherein air is supplied to the individual battery cells to stir and cool the electrolyte.

6. The method of claim 1 wherein water losses are compensated from a central water container of the permanently installed charging station.

7. In a system for charging the battery of a battery operated vehicle which comprises on-board gas recombining means:
 gas-recombining means permanently installed at a charging station, said last-named recombining means having adequate capacity to recombine gas evolved during full or compensating charging of said battery, while said on-board recombining means has adequate capacity only for gas evolved during charging below a charge factor of 1; and
 means for coupling said battery to said permanently installed recombining means.

8. The system of claim 7, wherein said coupling means comprises a three-way valve for directing said gas selectively to said on-board recombining means and to said permanently installed recombining means.

9. The system of claim 7, further comprising central water refilling means for said battery, operative from either of said recombining means.

10. The system of claim 7, wherein said battery has a plurality of cells, each cell having an air inlet which terminates below the electrolyte surface, and further comprising pumping means associated with the permanently installed recombining means for removing gas from above said surfaces, whereby said air is caused to stir said electrolyte and to dilute the gas above said surface.

* * * * *